`US012425890B2`

United States Patent
Alfarhan et al.

(10) Patent No.: US 12,425,890 B2
(45) Date of Patent: Sep. 23, 2025

(54) METHOD FOR REPORTING CHANNEL FAILURE

(71) Applicant: InterDigital Patent Holdings, Inc., Wilmington, DE (US)

(72) Inventors: Faris Alfarhan, Montreal (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 534 days.

(21) Appl. No.: 17/762,810

(22) PCT Filed: Sep. 30, 2020

(86) PCT No.: PCT/US2020/053401
§ 371 (c)(1),
(2) Date: Mar. 23, 2022

(87) PCT Pub. No.: WO2021/067354
PCT Pub. Date: Apr. 8, 2021

(65) Prior Publication Data
US 2022/0400396 A1    Dec. 15, 2022

Related U.S. Application Data

(60) Provisional application No. 62/908,832, filed on Oct. 1, 2019.

(51) Int. Cl.
*H04W 24/08* (2009.01)
*H04W 16/14* (2009.01)
(Continued)

(52) U.S. Cl.
CPC ........... *H04W 24/08* (2013.01); *H04W 24/10* (2013.01); *H04W 72/20* (2023.01); *H04W 74/0808* (2013.01); *H04W 16/14* (2013.01)

(58) Field of Classification Search
CPC ..... H04W 24/08; H04W 24/10; H04W 72/20; H04W 74/0808; H04W 16/14; H04L 1/1864
See application file for complete search history.

(56) References Cited

U.S. PATENT DOCUMENTS

| 2017/0332358 A1 | 11/2017 | Park et al. |
| 2019/0246417 A1 | 8/2019 | Dinan |

(Continued)

FOREIGN PATENT DOCUMENTS

| CA | 2989454 C | * 3/2022 | ........ H04W 72/1226 |
| CN | 109863777 A | 6/2019 | |
| TW | 201937972 A | 9/2019 | |

OTHER PUBLICATIONS

Qualcomm Incorporated, Procedure and format for beam index indication MAC CE, 3GPP TSG-RAN WG2 Meeting #107 R2-1911504, Aug. 30, 2019 (Year: 2019).*

(Continued)

*Primary Examiner* — Charles C Jiang
*Assistant Examiner* — Rachel Elizabeth Marks
(74) *Attorney, Agent, or Firm* — Flaster Greenberg, P.C.

(57) ABSTRACT

Methods and apparatuses are described herein for reporting channel failure, and may be used, among others, for New Radio (NR) operation in unlicensed spectrum (NR-U). Upon detecting a consistent uplink (UL) listen-before-talk (LBT) failure or upon detecting a beam failure on a cell, a Scheduling Request (SR) may be triggered to have a UL resource granted for transmission of the failure to another cell, or to a subset of other cells, using, for example, a failure recovery Medium Access Control-Control Element (MAC-CE). If no grant of an available UL resource can be obtained for transmission of the MAC-CE, or the grant is not suitable for the failure reporting, a failure recovery SR may be transmitted repeatedly to obtain an UL grant suitable for trans- (Continued)

mitting the failure report. In some cases, a WTRU may initiate a random-access procedure for transmitting the MAC-CE, for example when resources for failure reporting are not configured.

14 Claims, 9 Drawing Sheets

(51) Int. Cl.
    *H04W 24/10*     (2009.01)
    *H04W 72/20*     (2023.01)
    *H04W 74/0808*     (2024.01)

(56) References Cited

U.S. PATENT DOCUMENTS

| | | | |
|---|---|---|---|
| 2019/0261338 A1 | 8/2019 | Akkarakaran et al. | |
| 2021/0100031 A1* | 4/2021 | Cirik | H04W 76/19 |
| 2022/0070698 A1 | 3/2022 | Jiang | |
| 2022/0110159 A1* | 4/2022 | Shi | H04W 74/0866 |

OTHER PUBLICATIONS

Bitmap definition [online]. Oxford Lanaguages on Google [retrieved on Feb. 15, 2025]. Retrieved from the Internet: <URL: https://www.google.com/searchq=bitmap+definition&safe=active&sca_esv=1c28337f163e41c8&rlz=1C1GCEA_enUS1077US1077&biw=1920&bih=1039&ei=1yOxZ-bHBfGXwbkPnae-4Aw&ved=0ahUKEwim78Dq6saLAxXxSzABHZ2TD8wQ4>.*

Qualcomm Incorporated, Procedure and format for beam index indication MAC CE, Aug. 26-30, 2019, 3GPP TSG-RAN WG2 Meeting #107 R2-1911504 (Year: 2019).*

3rd Generation Partnership Project (3GPP), R2-1911504, "Procedure and format for beam index indication MAC CE", Qualcomm Incorporated, 3GPP TSG-RAN WG2 Meeting #107, Prague, Czech, Aug. 26- Aug. 30, 2019, 4 Pages.

3rd Generation Partnership Project (3GPP), R1-1908380, "Enhancements on multi-beam operations", MediaTek Inc., 3GPP TSG RAN WG1 #98, Prague, CZ, Aug. 26-30, 2019, 13 Pages.

Third Generation Partnership Project (3GPP), "Study on NR Industrial Internet of Things", (IoT), 3GPP TR 38.825 V16.0.0, 3rd Generation Partnership Project; Technical Specification Group Radio Access Network;(Release 16), Mar. 2019, 33 pages.

Third Generation Partnership Project (3GPP), "Study on NR-based access to unlicensed spectrum", (Release 16), 3GPP TR 38.889 V16.0.0, 3rd Generation Partnership Project; Technical Specification Group Radio Access Network, Dec. 2018, 119 pages.

Third Generation Partnership Project (3GPP), "Evolved Universal Terrestrial Radio Access", (E-UTRA); Physical layer procedures (Release 15), 3GPP TS 36.213 V15.0.0, Technical Specification Group Radio Access Network, Dec. 2017, 493 Pages.

Third Generation Partnership Project (3GPP), "Evolved Universal Terrestrial Radio Access", (E-UTRA); Medium Access Control (MAC) protocol specification (Release 15), 3GPP TS 36.321 V15.7.0, 3rd Generation Partnership Project; Technical Specification Group Radio Access Network, Sep. 2019, 134 pages.

Third Generation Partnership Project (3GPP), "Evolved Universal Terrestrial Radio Access", (E-UTRA); Radio Resource Control (RRC); Protocol specification (Release 15), 3GPP TS 36.331 V15.7.0, 3rd Generation Partnership Project; Technical Specification Group Radio Access Network, Sep. 2019, 962 pages.

Third Generation Partnership Project (3GPP), "NR Physical Layer Procedures for Control", 3GPP TS 38.213 V15.3.0, 3rd Generation Partnership Project; Technical Specification Group Radio Access Network (Release 15), Sep. 2018, 101 pages.

Third Generation Partnership Project (3GPP), "Physical layer procedures for data", (Release 15), 3GPP TS 38.214 v15.7.0, Technical Specification Group Radio Access Network; NR, Sep. 2019, 106 Pages.

Third Generation Partnership Project (3GPP), Medium Access Control (Mac), "Protocol Specification", (Release 15), 3GPP TS 38.321 V15.1.0, 3rd Generation Partnership Project; Technical Specification Group Radio Access Network; NR;, Mar. 2018, 67 pages.

Third Generation Partnership Project (3GPP), "Radio Resource Control", (RRC) Protocol Specification (Release 15), 3GPP TS 38.331 V15.7.0, 3rd Generation Partnership Project; Technical Specification Group Radio Access Network, Sep. 2019, 527 pages.

Third Generation Partnership Project (3GPP), "New WID on NR-Based Access to Unlicensed Spectrum", RP-182878, 3GPP TSG RAN Meeting #82 Sorrento, Italy Qualcomm Inc. Approval 9.1.1, Dec. 10-13, 2018, 8 pages.

* cited by examiner

METHOD FOR REPORTING CHANNEL FAILURE

CROSS REFERENCE TO RELATED APPLICATIONS

This application is the 371 National Stage of International Application No. PCT/US2020/053401, filed Sep. 30, 2020, which claims priority from U.S. Provisional Patent Application No. 62/908,832, filed Oct. 1, 2019, the contents of which are hereby incorporated herein by reference as if fully set forth.

BACKGROUND

Channel access in an unlicensed frequency band typically uses a Listen-Before-Talk (LBT) mechanism. In some cases, LBT is mandated independently of whether the channel is occupied or not. In other cases, immediate transmission after short switching gap can be applied.

For frame-based systems, LBT may be characterized by a Clear Channel Assessment (CCA) time (e.g., —20 µs), a Channel Occupancy time (e.g., minimum 1 ms, maximum 10 ms), an idle period (e.g., minimum 5% of channel occupancy time), a fixed frame period (e.g., equal to the channel occupancy time+idle period), a short control signaling transmission time (e.g., maximum duty cycle of 5% within an observation period of 50 ms), and a CAA energy detection threshold.

For load-based systems (e.g., transmit/receive structure may not be fixed in time), LBT may be characterized by a number N corresponding to the number of clear idle slots in extended CCA instead of the fixed frame period. N may be selected randomly within a range.

New Radio (NR) technology is specified by 3GPP. Unlike Long-Term Evolution (LTE), NR supports flexible transmission duration within a slot. Furthermore, NR supports "configured grant" (CG) type-1 for uplink (UL) transmissions, where the network semi-statically configures a UL grant and the Wireless Transmit/Receive Unit (WTRU) may autonomously use it without a layer-1 (L1) indication/activation. Configured grant type-2 is similar to type-1 but considers L1 indication/activation. In addition, NR supports Downlink (DL) Semi-Persistent Scheduling (SPS) resources—or DL CGs—, on which the WTRU may receive DL data on active DL CGs with no scheduling necessary for each DL Transmission Block (TB).

NR supports UL and DL services of different Quality of Service (QoS) requirements within a single WTRU, including traffic of varying latency and reliability requirements. NR further supports time-sensitive communications and networking (TSN), including deterministic and non-deterministic TSN traffic patterns and flows, which can be prevalent in factory automation settings using licensed or unlicensed spectrum.

NR operation in unlicensed band is desired. There is therefore a need to specify NR-based operation in unlicensed spectrum (NR-U).

SUMMARY

Methods and apparatuses are described herein for reporting channel failure. The methods may, for example, be achieved through methods for use in a wireless transmit/receive unit (WTRU) and may include a method in a WTRU using first and second cells, the method comprising detecting, by the WTRU, at least one UpLink Listen-Before-Talk (UL-LBT) failure or a beam failure on the first cell associated with one or more unlicensed frequencies; transmitting, by the WTRU using UL resources of a second cell, a failure recovery Scheduling Request (SR), to report the UL-LBT failure or the beam failure on the first cell; and conditionally cancelling the failure recovery SR.

As mentioned in the background section, NR operation in unlicensed band (spectrum) may be desired. Therefore, there is a need to specify NR-based operation in unlicensed spectrum, including specification of initial access, Scheduling/Hybrid Automatic Repeat request (HARQ), and mobility, along with coexistence methods with LTE-License Assisted Access (LAA) and other incumbent Radio Access Technologies (RATs). Deployment scenarios may include different standalone NR-based operation, different variants of dual connectivity operation e.g., EN-DC (E-UTRA-NR Dual Connectivity, where E-UTRA stands for Evolved Universal Terrestrial Access Network) with at least one carrier operating according to the LTE radio access technology (RAT) or NR Dual Connectivity (NR-DC) with at least two set of one or more carriers operating according to the NR RAT, and/or different variants of Carrier Aggregation (CA) e.g., possibly also including different combinations of zero or more carriers of each of LTE and NR RATs.

NR-U (NR operation in unlicensed spectrum) may support configured grant transmissions as well as CodeBlock Group (CBG) based transmissions for the configured grant.

In NR, Radio Link Failure (RLF) due to uplink radio link failures is triggered upon reaching a maximum number of re-transmissions indicated by Radio Link Control (RLC), and upon reaching a maximum number of preamble transmissions resulting in a random-access problem indicated by Medium Access Control (MAC). However, such triggers may occur too late in an NR-U scenario where load conditions can increase unexpectedly. For this reason, additional RLF criterion or criteria that trigger when the WTRU fails to access the channel repeatedly can be used.

Due to hidden nodes, the channel might not be symmetric for UL and DL directions. Therefore, an RLF mechanism based on UL LBT failures may preferably be handled separately from that of the downlink. Moreover, an explicit RLF mechanism based on UL LBT failure is useful given that some MAC counters for UL procedures (e.g., Random Access Channel (RACH) and Scheduling Request (SR)) may not be incremented when UL LBT fails. When a hidden node is present and is affecting UL channel acquisition, even though the Received Signal Strength Indicator (RSSI) or Channel Occupancy (CO) measures the interference from the hidden node, the WTRU may not be able to report this RSSI/CO because it cannot access the channel. Further, given that RSSI is reported on a periodical basis; the reporting periodicity may not be timely enough for the WTRU to determine the occurrence of a persistent UL LBT failure and take necessary corrective actions on time (e.g., due to a newly arrived hidden node). A "consistent UL LBT failure" or "persistent UL LBT failure" can be, for example, characterized by detection of a repeated number of UL LBT failures. For example, such failure may be reported by the WTRU to the network on a different serving cell, where channel access is more likely.

In a beamformed NR system, the WTRU may be configured to maintain one or multiple beam pairs. The WTRU may monitor certain periodic Channel State Information— Reference Signals (CSI-RS) on a serving DL beam to assess its quality and may compute a corresponding quality metric. According to an embodiment, if the beam's quality in a given RS period is below a configured threshold, the WTRU's Physical (PHY) entity (e.g., layer, and/or communication layer) may report a Beam Failure Instance (BFI) to the MAC sub-layer. In order to re-establish lost beam pair(s) in a faster manner compared to the Radio Link Monitoring (RLM)/RLF procedure, the WTRU's MAC layer may employ a Beam Failure Recovery (BFR) procedure in which a Beam Failure Recovery request may be reported to the network upon detecting a beam failure.

BFR can be configured for beam maintenance on a cell (e.g., Primary cell, PCell, or secondary cell, SCell). The MAC entity may maintain a beam failure instance counter (BFI counter), for example for the purpose of beam failure detection. The MAC entity counts the number of beam failure instance indications received from the PHY entity. If the BFI counter exceeds a certain maximum number of BFIs, a BFR request is triggered to notify the serving gNB (gNodeB) that a beam failure has been detected. For example, when the beam failure is detected on a cell (e.g., SCell), the WTRU may report the failure to the network by constructing and including a MAC CE on an UL resource of a different cell.

To report a BFR request detected on the PCell, the WTRU may initiate a Random-Access (RA) procedure with certain parameter values (e.g., PreambleTransMax, power ramping step, and the target received preamble power). Such random-access procedure may be used for beam re-establishment, as the WTRU may select an appropriate Physical Random-Access Channel (PRACH) preamble and/or PRACH resource dependent on the best measured downlink beam (or DL Synchronization Signal Block (SSB)). The WTRU may have means to reestablish a beam pair when it can determine an association between DL beams and UL preambles and/or PRACH occasions, whereby the downlink beam selected by the WTRU may be tested by receiving the Rando-Access Response (RAR) on it. Such reestablishment RA procedure may be made faster if the gNB configures a certain set of contention-free PRACH preambles/resources, which can be prioritized for selection by the WTRU upon initiating the RA procedure.

BRIEF DESCRIPTION OF THE DRAWINGS

A more detailed understanding may be had from the detailed description below, given by way of example in conjunction with drawings appended hereto. Figures in the description are examples. As such, the figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Figure 1A:
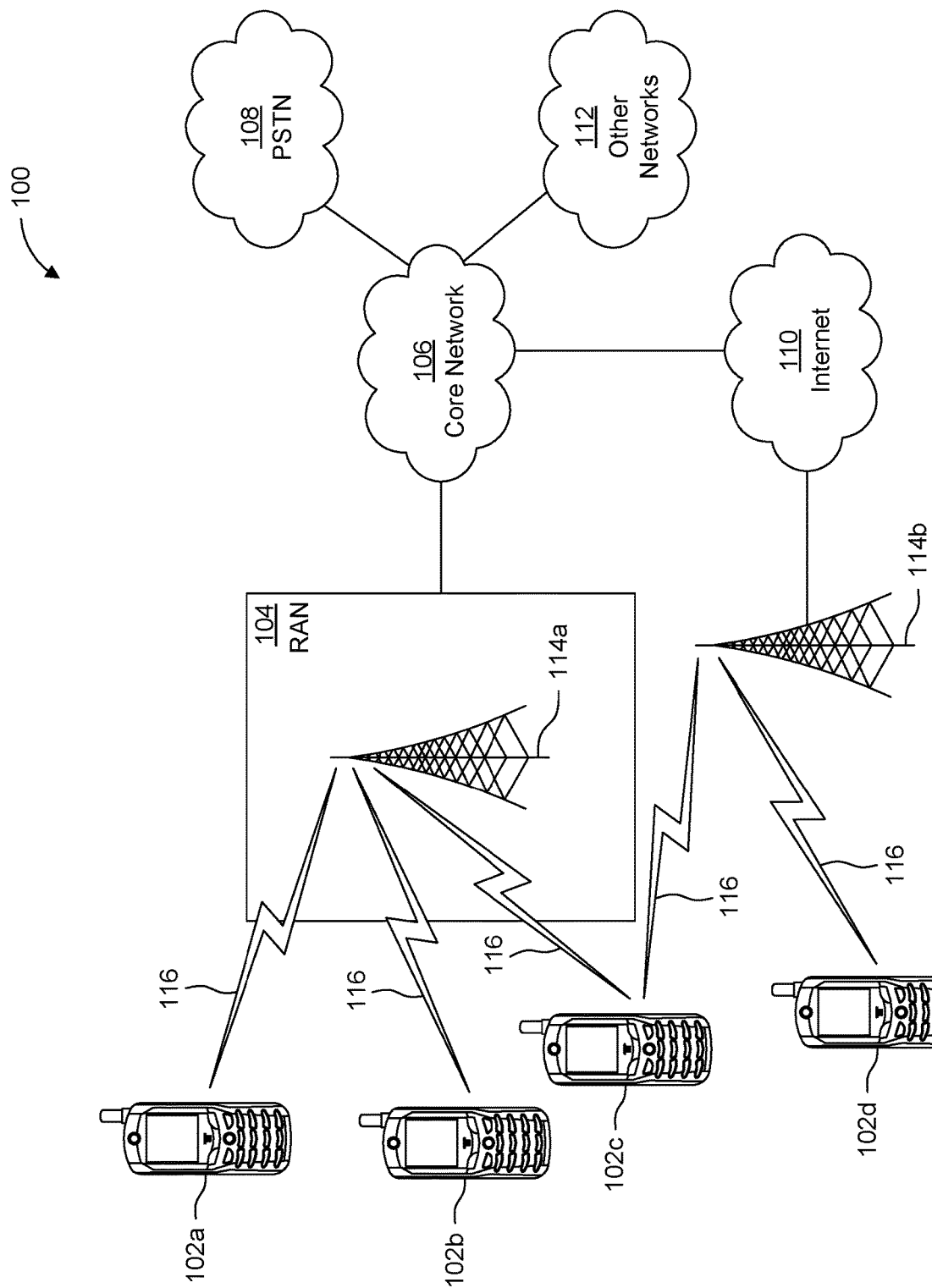
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
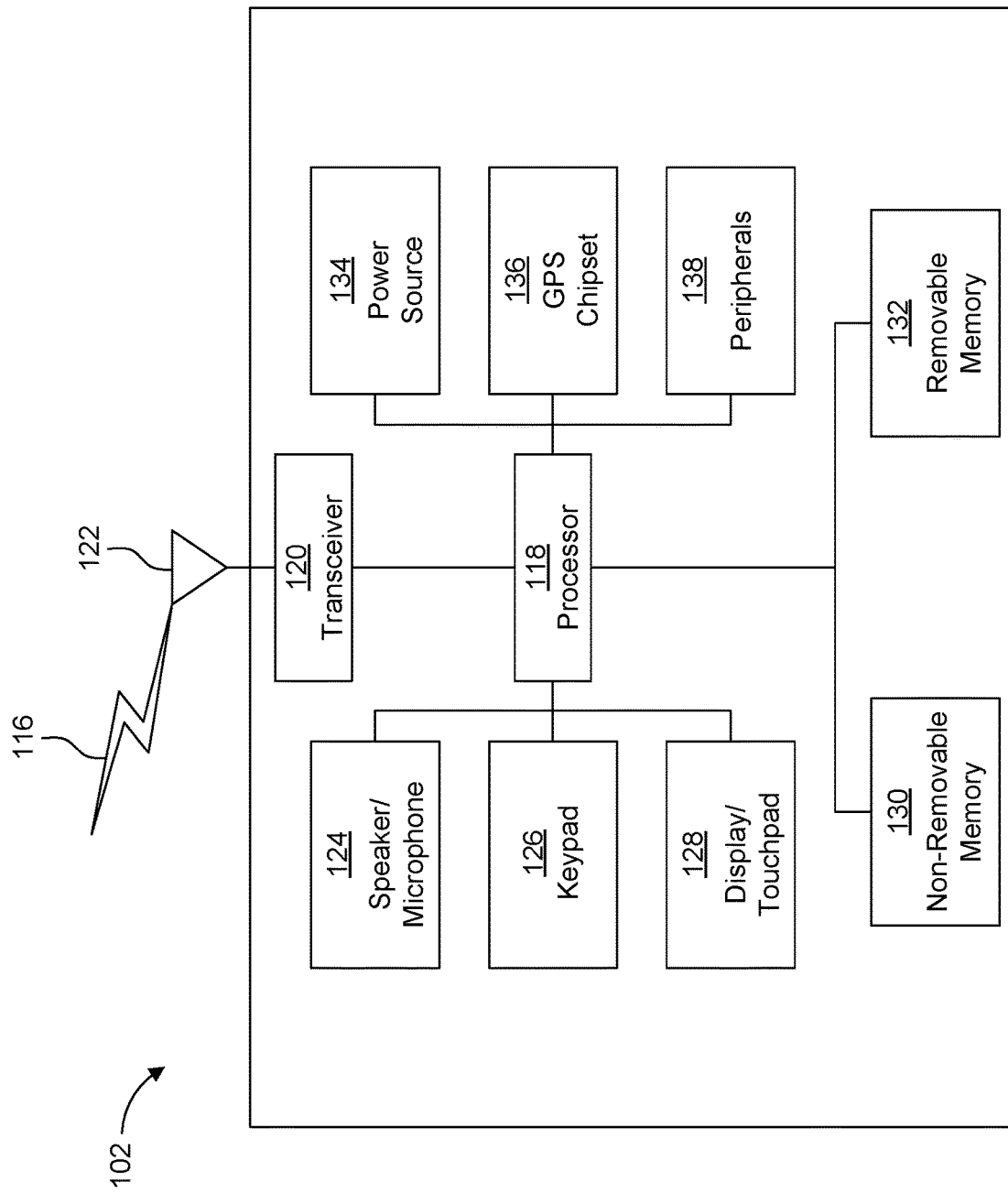
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
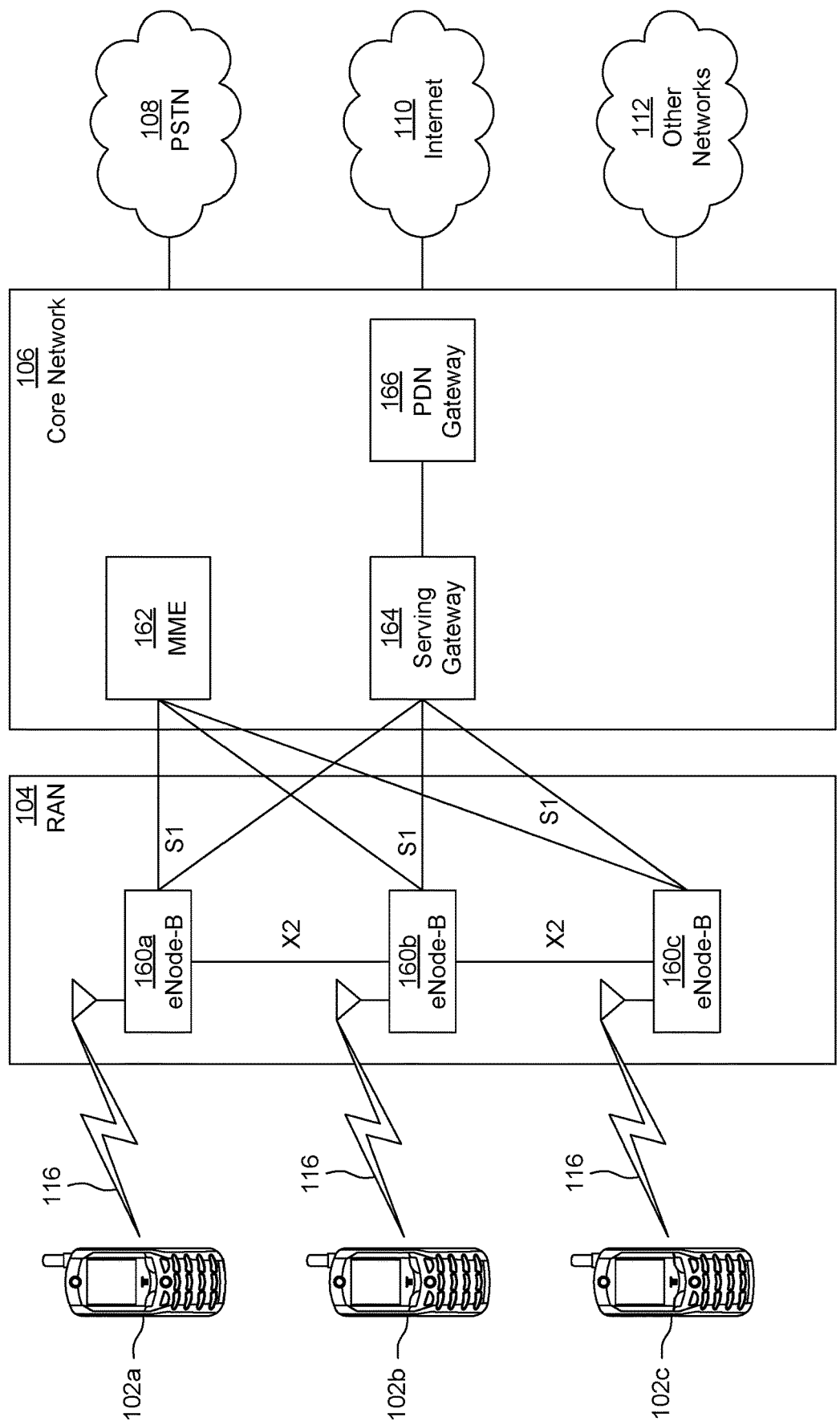
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
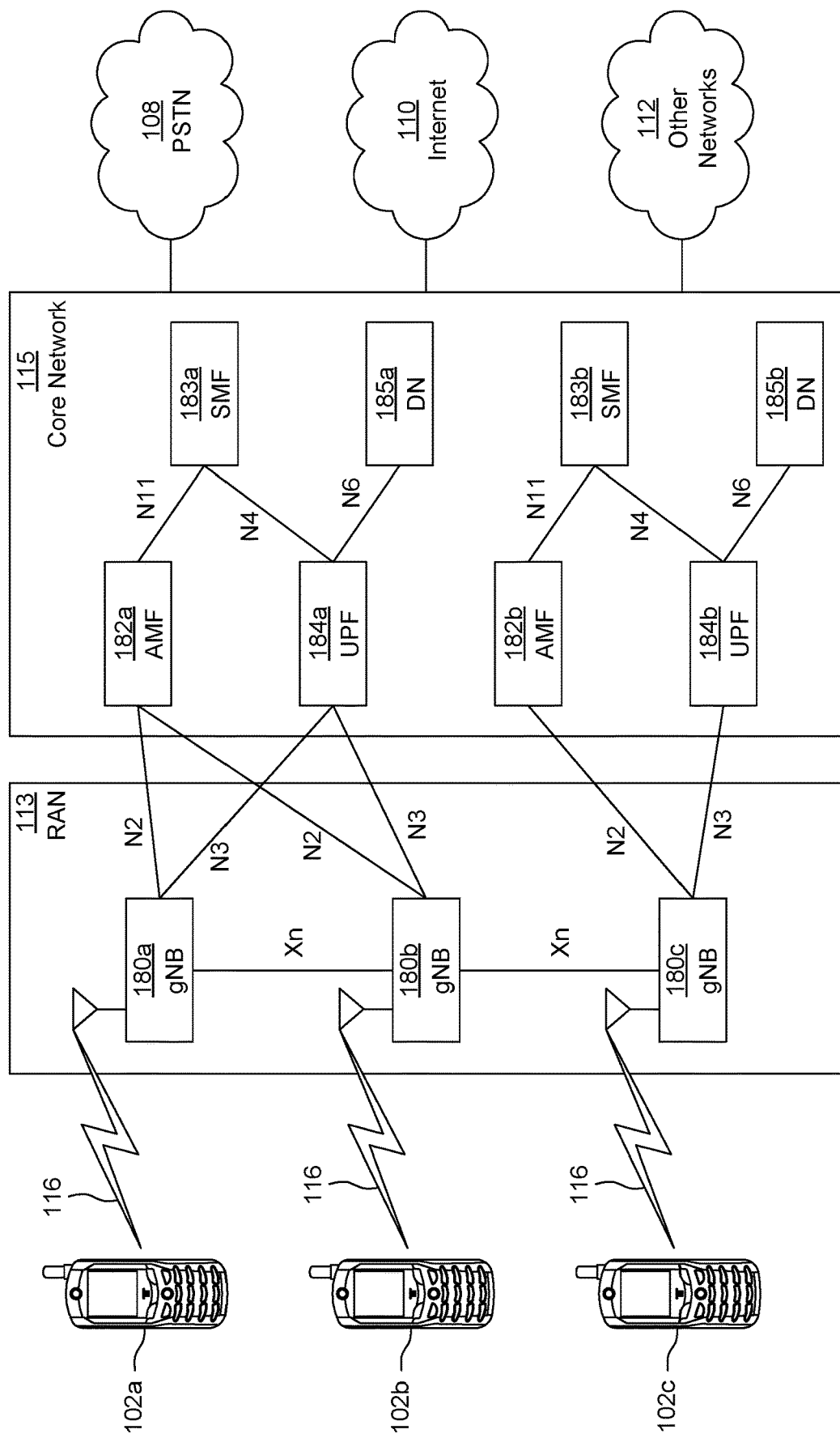
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Reporting Channel Failure

In the following, the term 'UL LBT failure' implies that an WTRU was not able to acquire a channel for an uplink transmission attempt after a CCA part of an LBT procedure. UL LBT failure may be determined based on receipt of a 'notification of LBT failure' or 'indication of LBT failure' from the physical (PHY) layer; among other determination methods. The opposite applies when the term 'UL LBT success' is used.

Upon detecting a consistent/persistent UL LBT failure or a beam failure (Beam Failure Detection, BFD) on a cell (e.g., secondary cell, Scell, or Primary cell, Pcell), the WTRU may report the failure on another cell, e.g. using a failure recovery Medium Access Control-Control Element (MAC-CE). 'Consistent/persistent' UL LBT failure may mean that the a WTRU was not able to acquire a channel for an uplink transmission attempt for a subsequent number of times during a time interval, see also the summary section of the present document.

The network may benefit from such failure reporting to timely take necessary corrective actions to recover from the failure.

The failure reporting MAC-CE may be sent on any other cell, or a specific subset of cells, e.g., a cell in a Group of Cells (CG) in control of the cells in the CG, the SpCell. When the WTRU does not have a grant or does not have a grant suitable for transmission of a failure reporting MAC-CE, the WTRU may trigger a SR of a new type, an SR-like signal to request an UL grant, herein referred to as a 'failure recovery SR' or 'SR triggered by failure reporting' or 'non-Buffer Status Report SR (non-BSR SR)'. Such failure recovery SR, unlike any other SR type, is not triggered by a new BSR and hence is not associated with a BSR. Further, such SR is not necessarily associated with a certain Logical Channel (LCH).

Methods and apparatuses described herein may allow the WTRU obtain an appropriate resource for transmitting the failure recovery SR and report the failure, so that the network can take corrective actions timely to recover from the failure.

Reporting Channel Failure Using a Recovery SR on a Different Cell

According to an embodiment, the WTRU may trigger transmission of a failure recovery SR when the WTRU does not have an UL grant available for transmission of the failure reporting MAC-CE.

According to an embodiment, the WTRU may trigger transmission of a failure recovery SR when the available grant(s) is (are) not suitable for transmission of the failure reporting MAC-CE.

Suitability of Grants for Transmission of a Failure Reporting MAC-CE

According to an embodiment, the WTRU may trigger transmission of a failure recovery SR when the available grant(s) is (are) not suitable for transmission of the failure reporting MAC-CE because the available grant(s) does (do) not meet a configured set of parameters that define grant suitability for transmission of failure reporting MAC-CE.

According to an embodiment, the WTRU may trigger transmission of a failure recovery SR when the available grant(s) is (are) not suitable for transmission of the failure reporting MAC-CE because the available grant(s) does (do) not meet LCH restrictions configured for the LCH.

Available Grant(s) does (do) not Meet a Configured Set of Parameters

According to an embodiment, the WTRU may be configured by Radio Resource Control (RRC) with a set of parameters that may define grant suitability for transmission of failure reporting MAC-CE, including but not limited to, a subset of suitable cells, a subset of Bandwidth parts (BWPs) or sub-bands, a subset of suitable grant priorities, a subset of suitable numerologies, a subset of Physical Uplink Shared Channel (PUSCH) durations, a subset of grant types (e.g., configured grant, configured grant index, or a dynamic grant), and/or a property of the grant's latency and reliability (e.g., periodicity, Modulation and Coding Scheme (MCS), MCS table, or power control setting). If the grant does not satisfy the RRC configured suitability criteria, the WTRU triggers transmission of a failure reporting SR. In one example embodiment, the WTRU may be predefined to trigger transmission of a failure recovery SR if it does not have an available grant on a different cell.

Available Grant(s) does (do) not Meet LCP LCH Restrictions

According to an embodiment, the WTRU may be configured by RRC with an LCH associated with failure reporting detected on any cell or a specific cell. RRC may further configure the WTRU with LCP LCH selection restrictions for such LCHs associated with failure reporting. The WTRU may thus trigger transmission of a failure recovery SR upon detecting a beam failure or a consistent LBT failure on a cell and the available grant(s) does (do) not meet the LCP LCH selection restrictions configured for the LCH associated with the failure reporting.

Failure Recovery SRs

According to an embodiment, a WTRU may be statically or semi-statically configured with a {priority, LCH, SR configuration(s), and/or Physical Uplink Control Channel (PUCCH) resource} for transmission of failure recovery SRs. For example, RRC may configure the WTRU with (a) certain SR configuration(s), or more generally a set of PUCCH resources, to be used for transmission of a failure recovery SR. In another example, the WTRU may be configured by RRC with an SR configuration per cell, BWP, or sub-band. RRC may further configure a mapping between a cell, BWP, or sub-band configured for detecting a beam failure or a consistent LBT failure and an SR configuration; the WTRU may select the SR configuration associated with cell/BWP/sub-band on which beam failure or a consistent LBT failure was detected. In another example, the WTRU may use any PUCCH resource configured on the cell for transmission of a failure recovery SR. In such a case, a failure recovery SR may have specific priority (e.g. highest priority) compared to other SRs, HARQ/ACK feedback or CSI reports that may be included in the PUCCH resource. In another example, the priority of the failure recovery SR may be configurable.

In another embodiment, the WTRU may be configured with a static priority or a certain LCH, which the WTRU may use for determining which SR configuration to use and/or determine the priority of the SR, among other possible uses. For example, RRC may configure the WTRU with a certain LCH to be associated with failure recovery SRs, and/or the cell on which beam failure was detected.

In one embodiment, the WTRU may select a PUCCH resource for the transmission of a failure recovery SR as a function of at least one of the following: latency to the next PUCCH occasion, PUCCH resource periodicity, the cell on which the failure occurred, cells that are suitable for transmission of the failure reporting MAC-CE, channel measurements (e.g. RSRP or CO), and/or resource validity. The WTRU may consider a PUCCH resource as invalid if it is outside of its active UL BWP, if LBT fails, or fails repeatedly. The WTRU may select a PUCCH resource if it occurs during an active Channel Occupancy Time (COT). For example, the WTRU may select PUCCH resources for a failure recovery SR according to the required LBT Category for the resource.

The WTRU may associate a priority with a certain failure recovery SR, e.g. when it overlaps with other Uplink Control Information (UCI), PUSCH, or any other transmission and/or actions related to intra-WTRU prioritization need to be performed. For the purpose of determining the priority of a failure recovery SR, the WTRU may associate the priority of the SR according to: {a static value configured by RRC, the LCH configured for the SR, the applicable SR configuration, the LCH that triggered the SR, and/or the LCHs mapped to the SR configuration}. In the absence of an LCH associated with the failure recovery SR, the WTRU may determine the priority of the SR based on the SR configuration. For example, the WTRU may determine the priority of the SR from a semi-static priority value configured by RRC for the selected SR configuration. In another example, the WTRU may determine the priority of the recovery SR from the highest priority LCH mapped to the same SR configuration. In a different example, the WTRU may strictly prioritize a failure recovery SR over other uplink transmissions based on transmission type; the WTRU may prioritize a failure recovery SR over another overlapping PUSCH or Physical Random-Access Channel (PRACH) transmission.

In configurations where failure is detected on more than one cell, the WTRU may have more than one pending failure recovery SR. The WTRU may prioritize between failure recovery SRs and/or other uplink transmissions (including PRACH, PUSCH, UCI, PUCCH). The WTRU may compare the priorities of pending overlapping failure recovery SRs to determine which SR to prioritize and drop the deprioritized transmissions (including other pending failure recovery SRs). In one method, the WTRU may start a recovery timer associated with each failure recovery SR, which the WTRU may start when Beam Failure Detection happens or when the associated failure recovery SR is triggered on the cell; the WTRU may prioritize the transmission of failure recovery SR(s) per ascending order of time to expiry, when comparing multiple failure recovery SRs that overlap on the same PUCCH resource. In one method, the WTRU may assign a priority to each SR as a function of the Scell or associated configuration of the Scell. For example, the WTRU may prioritize the transmission of SR(s) associated with cells configured with higher priority services (e.g. based on configured LCH-to-cell restrictions). In another method, the WTRU may trigger a single SR for multiple Scells; the WTRU may indicate a set of cells for which UL LBT failure occurred in a single SR transmission and/or part of the failure reporting MAC-CE transmission. The SR may represent a bitmap of cells with bits toggled for cells where failure occurred. In another method, the WTRU may include multiple MAC-CEs in the same PUSCH transmission to report failures on more than one cell.

In one embodiment, the WTRU may monitor PDCCH on a certain cell, BWP, and/or coreset as a function of the cell or BWP on which the failure was reported. For example, the WTRU may monitor PDCCH on cell index x after transmitting a failure recovery SR on cell x after detecting a failure on cell y. In another example, after detecting a beam failure on cell y, the WTRU may transmit a failure recovery SR on a different cell x, then monitor PDCCH on cell y, potentially on a certain coreset and/or a certain BWP of that cell. In another example, the WTRU may transmit a failure recovery SR on the same cell on which beam failure recovery was detected, but then monitor the PDCCH on another cell (e.g. the SpCell or the PCell), e.g. when other cells don't have a valid PUCCH resource.

Cancelling Transmittal of a Failure Recovery SR

The WTRU may cancel an SR triggered by failure reporting after at least one of the following 1-10 has occurred:
1. Transmission of a failure reporting MAC-CE. For example, the WTRU may cancel transmission of a failure recovery SR upon transmission of a failure reporting MAC-CE for the cell on which beam failure or a consistent LBT failure was detected, or upon delivering a PDU to the physical layer containing a failure reporting MAC-CE for cell on which beam failure or a consistent LBT failure was detected.
2. Assembly of a MAC PDU containing a failure reporting MAC-CE. For example, the WTRU may cancel transmission of a failure recovery SR upon assembling a MAC PDU which contains a failure reporting MAC-CE for the cell on which beam failure or a consistent LBT failure was detected.
3. Reception of a beam failure recovery response from the gNB, in case the SR was triggered to report a beam failure on another cell. For example, the WTRU may cancel transmission of a failure recovery SR upon PDCCH reception on a certain search space associated with the cell on which beam failure was detected. The WTRU may further consider the cell on which PDCCH was received, i.e. cancel transmission of a failure recovery SR upon PDCCH reception on the cell on which beam failure was detected.
4. Reception of an uplink grant. For example, the WTRU may cancel transmission of a failure recovery SR upon receiving any grant suitable for transmitting the corresponding failure reporting MAC-CE or a Message 3 (Msg3) grant.
5. LBT success for at least one LBT sub-band of the cell and/or BWP on which a UL consistent LBT failure was detected.
6. Reception of a channel acquisition signal on the cell and/or BWP on which the consistent UL LBT failure was detected.
7. Expiry of a certain timer. For example, the WTRU may cancel a failure recovery SR upon expiry of a recovery timer or expiry of a timer that resets counting {LBT failures, or beam failures notifications from lower layers}.
8. Transmission of the failure recovery SR on an applicable PUCCH resource or a preamble part of RA-SR initiated by failure reporting on the cell.
9. Transmitting an uplink signal or transmission. For example, the WTRU may cancel the transmission of the failure recovery SR after LBT success for an uplink transmission on the cell. For example, the WTRU may cancel the transmission of the failure recovery SR upon transmitting an uplink transmission after receiving the beam failure recovery response or a channel acquisition signal from the gNB.
10. Reception of network re-configuration of parameters related to the beam failure detection/recovery procedure or the UL consistent LBT failure detection/recover procedure. The WTRU may further trigger transmission of another failure recovery SR according to the reconfigured parameters.

Random-Access SR Triggered by Failure Reporting

In some cases, PUCCH resources for failure reporting may not be configured or no PUCCH resources are available in the active BWP in the cell in which the failure is reported. For example, the WTRU may detect a beam failure on an Scell though PUCCH resources for transmission of the failure recovery SR are not configured or configured on a different BWP that is not active in the reporting cell. The WTRU may initiate a random-access (RA) procedure when PUCCH resources for failure reporting are not configured or not in the active BWP.

The WTRU may be configured with a certain set of PRACH resources (e.g. Contention-Free Random Access (CFRA) preambles and/or a subset of PRACH resources/occasions) for failure reporting. The WTRU may select a subset of PRACH resources and/or preambles according to the cell, BWP, or sub-band on which failure was detected. The WTRU may select prioritized Contention-Based Random Access (CBRA) parameters, including backoff and power ramping—if configured by higher layers—, for an RA initiated by failure on a different cell.

If the WTRU receives a Msg3 grant that is not sufficient to include the failure reporting MAC-CE, the WTRU may indicate to the network the need for a subsequent grant or assemble a short or truncated failure reporting MAC-CE.

According to an embodiment, in a 2-step RA procedure, the WTRU may include the failure reporting MAC-CE in the data payload part of MsgA. The WTRU may include the MsgA payload any of the MAC-CE contents listed in the next section without embedding them inside the MAC-CE itself, including the cell index, among others. The WTRU may monitor the MsgB reception addressed to its Cell-Radio Network Temporary Identifier (C-RNTI). MsgB, or more generally the failure recovery response, payload may include information for regarding reconfiguration of PDCCH, Channel State Information—Reference Signals (CSI-RS), sub-band or BWP configurations, or an RRC message.

Failure Reporting MAC-CE Design and Assembly

The WTRU may assemble the failure reporting MAC-CE with the highest priority or a certain predefined priority in the LCP procedure. For example, the WTRU may allocate a part of the UL grant size to the failure recovery MAC-CE before allocating any bits for other MAC-CEs or uplink data.

The WTRU may include at least one of the following contents 11-19 in the failure reporting MAC-CE:

11. The cell index of the cell on which beam failure or an UL consistent LBT failure was detected. The WTRU may include, in the same MAC-CE, a list of cells on which a failure was detected. For example, the WTRU may include a bit map to indicate which cells have detected a failure.
12. The LCH index corresponding to the failure reporting or the LCH associated with failure reporting. For example, the WTRU may be predefined or configured with a certain LCH associated with the BFR reporting MAC CE or the consistent UL LBT failure reporting MAC CE.
13. The BWP index of the BWP on which beam failure or an UL consistent LBT failure was detected.
14. The sub-band on which beam failure or an UL consistent LBT failure was detected.
15. An RRC message, including RRC connection reestablishment request, among other RRC messages. The WTRU may include such RRC message part of the same MAC PDU on which the failure reporting MAC-CE is included, instead of inside the MAC-CE itself
16. Measurements, including but not limited to, Reference Signal Received Power (RSRP), Signal-to-Reference-and-Noise Ratio (SINR), Received Signal Strength Indicator (RSSI), and/or channel occupancy, for the cell on which failure was detected.
17. Index or indices of preferred beams, e.g. of (a) beam(s) that best meet(s) a certain preconfigured or predefined criteria, which may include RSRP, SINR, RSSI, and/or channel occupancy.
18. Index or indices of preferred sub-bands or BWPs in the cell reported for failure, e.g. that best meet(s) a certain preconfigured or predefined criteria, which may include RSRP, SINR, RSSI, and/or channel occupancy. The WTRU may indicate a reserved value when no new candidate {beam, sub-band, or BWP} meet a configured threshold for the measurement criteria.
19. Contents of the transmission that failed. For example, a WTRU may have been attempting to report a HARQ feedback and was unable to acquire the channel due to failed LBT. The failure reporting MAC-CE may include the contents of the HARQ feedback. In another example, the WTRU may have been attempting to perform 2-step RACH for a small data transmission. The MAC-CE may point to a TB including the small data transmission.

The WTRU may include in PUSCH payload any of the MAC-CE contents above without embedding them inside the MAC-CE itself, part of the same transmission (e.g., using a separate MAC-CE).

The WTRU may adjust or include a subset of the contents of the recovery MAC-CE depending on the size of the UL grant. For example, the WTRU may assemble a short failure reporting MAC-CE or a truncated failure reporting MAC-CE. In one example, the WTRU may count the {number of padding bits, or Transport Block Size (TBS)} prior to assembly of the failure reporting MAC-CE. If the {number of padding bits, or TBS} is higher than a certain first threshold, the WTRU may assemble a full failure reporting MAC-CE format. If the {number of padding bits, or TBS} is lower than a first threshold, the WTRU may include a short failure reporting MAC-CE. If the {number of padding bits, or TBS} is lower than a second threshold, the WTRU may assemble a truncated failure reporting MAC-CE.

Termination of Failure Recovery Procedure Reported on a Different Cell

The WTRU may consider a failure recovery to be successfully completed after at least one of the following 20-26 has occurred:

20. Reception of a failure recovery response from the gNB. For example, the WTRU may consider a failure recovery procedure successful after receiving the failure recover response or a channel acquisition signal from the gNB. The WTRU may consider the BFR procedure successful upon PDCCH reception on a certain search space associated with the cell on which failure was detected. The WTRU may further consider the cell on which PDCCH was received; for example, the WTRU may consider the BFR procedure successful upon PDCCH reception on the cell on which beam failure was detected.
21. Reception of an uplink grant. For example, the WTRU may cancel transmission of a failure recovery SR upon receiving any grant suitable for transmitting the corresponding failure reporting MAC-CE or a Msg3 grant.
22. Transmission of a failure reporting MAC-CE. For example, the WTRU may consider the recovery procedure successful upon transmission of a failure reporting MAC-CE for the cell on which beam failure, or upon delivering a PDU to the physical layer containing a failure reporting MAC-CE for cell on which beam failure was detected.
23. Transmitting an uplink signal. For example, the WTRU may consider a failure recovery procedure successful after transmitting an uplink signal, possibly after reporting the failure or after reception of a grant in the failure recovery response from the gNB.
24. Measuring a success. For example, succeeding an LBT for an UL transmission on the failed cell. Or measuring one or a number of L1 sample(s) with the configured criteria above the threshold (e.g. RSRP, SINR, etc)
25. Receiving a DL RRC message, including an RRC reconfiguration message, an RRC connection re-establishment message, among other RRC messages.
26. Successful reception of a DL message in a random-access procedure, including Msg4 in a 4-step RA procedure imitated by failure reporting or MsgB in a 2-step RA.

Figure 2:
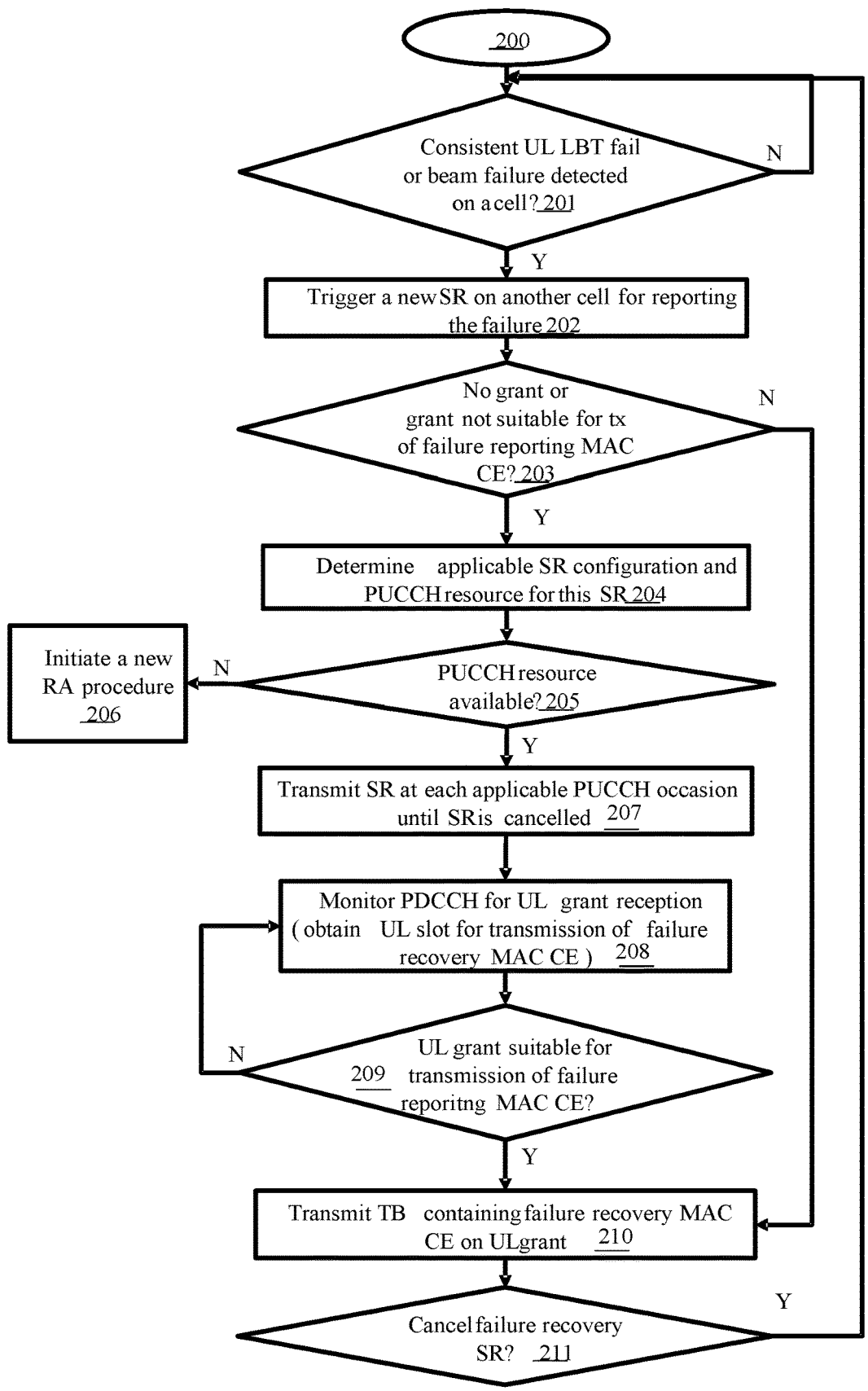
FIG. 2 is a flow chart illustrating a method for reporting channel failure according to an embodiment.

FIG. 2 is a flow chart illustrating a method 200 for reporting channel failure according to an embodiment. In a 201, it may be determined if there is a (consistent, persistent) UL LBT failure or if a beam failure is detected on a cell. If there is no such failure (201-N), 201 may be repeated. If there is such failure (201-Y), the WTRU may trigger a new SR (failure recovery SR) in 202 on another cell for reporting the failure, to have a resource granted (UL slot(s)) to send a failure reporting MAC-CE, in order to inform the network of the channel failure, so that the network can take appropriate measures to recover from the failure. Then 203 may be engaged, in which it may be determined if the WTRU has obtained (a) UL grant(s) (i.e., if the request to obtain an UL resource for transmission of the failure reporting MAC-CE is granted), and according to an embodiment, when (a) grant(s) is (are) obtained, it may be determined if the obtained grant(s) is (are) suitable for transmission of the failure reporting MAC-CE. If it is determined that grant(s) is (are) obtained, and according to an embodiment, that the obtained grant(s) is (are) suitable for transmitting the failure reporting MAC-CE, 210 may be engaged (203-N), in which (a) TB(s) comprising the failure reporting MAC-CE may be transmitted on the granted UL(s). If it is however determined that no grant(s) is (are) obtained, or, according to an embodiment, that the obtained grant(s) may be unsuitable for transmission of the failure reporting MAC-CE, 204 may be engaged (203-Y). Embodiments describing how it is determined whether the obtained one or more grants may be considered to be suitable for transmitting the failure reporting MAC-CE are described in section "Suitability of grants for transmission of a failure reporting MAC-CE" in the present document. The non-availability of the grant(s) and according to an embodiment the non-suitability of the obtained grant(s) may trigger transmission of a 'new' (another, next, 'failure recovery') SR, 204, to obtain (a) grant(s), or (a) suitable grant(s), for transmission of the failure reporting MAC-CE. Therefore, in 204, the applicable SR configuration for the 'new' SR and applicable PUCCH resource may be determined for transmission of the 'new' SR, see section 'Suitability of grants for transmission of failure reporting MAC-CE' and subsection 'Failure recovery SRs' in the present document. In 205, it may be determined if the applicable PUCCH resource is available for such transmission. If no applicable PUCCH resource is available (205-N), a Random-Access procedure may be engaged in 206, further described in section 'Random-Access SR triggered by failure reporting' in the present document. If however an applicable PUCCH resource is available, 207 may be engaged, in which a 'new' SR (i.e., with the above mentioned applicable SR configuration) may be transmitted, for example at each applicable PUCCH occasion, until transmission of 'new' SRs may be cancelled in 211. Following the transmission of the 'new' SR in 207, the PDCCH may be monitored for UL grant reception in 208. When a grant is obtained, it may be determined in 209 according to an embodiment whether the granted UL is suitable for transmission of the failure reporting MAC-CE. If the obtained grant(s) may be not suitable, 208 may be repeated. If however a suitable grant is available, a failure reporting MAC-CE may be transmitted in a TB in 210 on the granted UL(s). Finally, in 211, it may be determined if transmission of 'new' SRs may be cancelled; see section 'Cancelling transmittal of a Failure Recovery SR' in the present document. If the transmission may be not cancelled (211-N), 207-210 may be not stopped. If the transmission may be cancelled (211-Y), 201 may be reengaged.

In certain representative embodiments, the method may comprise receiving, by the WTRU, a grant indicating UL resources of the second cell for transmission, and transmitting by the WTRU, using the indicated resources, a failure reporting Medium Access Control-Control Element (MAC-CE) on the second cell. For example, the failure recovery SR is an SR that is not associated with a logical channel or is the SR that is associated with a default logical channel. For example, the transmitting of the failure recovery SR is in accordance with a static or semi-static SR configuration. For example, the detecting of the at least one UL-LBT failure or the beam failure on the first cell includes determining that no or an insufficient quantity of UL resources on the first cell are available for transmission. For example, the failure recovery SR is cancelled when any of the following conditions apply:
- transmission of the failure reporting MAC-CE;
- assembly of a MAC Protocol Data Unit, PDU, containing the failure reporting MAC-CE;
- receipt of a beam failure recovery response;
- successful UL-LBT for at least one LBT sub-band of the first cell and/or BWP on which said UL-LBT failure was detected;
- receipt of a channel acquisition signal on said first cell on which said UM-LBT failure was detected.

In certain representative embodiments, the method may further comprise retransmitting the failure recovery SR until the failure reporting MAC-CE has been transmitted.

In certain representative embodiments, the method may further comprise storing the SR configuration in the WTRU; and changing or adjusting the stored SR configuration via Radio Resource Control (RRC) signaling. For example, said SR configuration specifies at least a requirement for UL resources for transmission of the failure reporting MAC-CE being any of:
- at least one cell identifier specifying said second cell;
- at least one set of Bandwidth Parts (BWPs);
- at least one set of grant priorities;
- at least one set of Physical Uplink Shared Channel (PUSCH) durations;
- at least one set of grant types being any of configured grant, configured grant index, dynamic grant;
- at least one property of a grant being any of a latency, reliability, said reliability being any of a periodicity, Mission Critical Service, Mission Critical Service table, power control setting;
- at least one Logical Channel for transmission of the failure reporting MAC-CE.

According to certain representative embodiments, the failure reporting MAC-CE may comprise any of:
- a cell index of said first cell on which said UL-BLT failure or said beam failure is detected;
- a Bandwidth Part, BWP, of a BWP on which said UL-BLT failure or said beam failure is detected;
- a sub-band on which said UL-BLT failure or said beam failure is detected;
- a Radio Resource Control, RRC, message;
- at least one measurement which may comprise any of Reference Signal Received Power, RSRP, Signal-to-Reference-and-Noise Ratio, SINR, Received Signal Strength Indicator, RSSI, channel occupancy, for the first cell, on which said UL-BLT failure or said beam failure is detected.

Handling Multiple PDCCHs in a Multi-Tx/Rx Point (TRP) Cell

There may be different types of operation in a multi-TRP cell, among, for example: single-PDCCH configuration, which enables cross-TRP scheduling/transparent to MAC, and two-PDCCH configuration per cell (independent Downlink Control Information (DCIs), e.g. for non-ideal backhaul). In scenarios where a cell has a single MAC entity for multiple TRPs, the cell may have a single uplink channel common for all TRPs. Since backhaul conditions are not ideal to timely coordination scheduling and transmissions between the different TRPs, a single cell may have two PDCCHs whereby each PDCCH schedules transmissions per TRP group independently. In some cases, TRPs in the cell may have different Physical Cell Identities (PCIs).

Impact of Multiple PDCCHs in a Multi-TRP Cell on MAC Discontinuous Reception (DRX)

According to an embodiment, when the MAC entity is configured with DRX, the WTRU may monitor both (or multiple) PDCCHs during active time. In another method, the WTRU may be configured to monitor either PDCCH depending on the node from which scheduling was last received.

According to an embodiment, the WTRU may start a subset of DRX timers with a value which depends on which PDCCH was last used to schedule the WTRU (e.g. for a downlink assignment or an uplink grant). For example, the WTRU may start the {DL, UL} drx-HARQ-RTT-Timer (RTT=Round Trip-Time) after receiving a PDCCH indicating a {DL assignment, UL transmission}, where the value of the timer is selected from between two values configured by RRC as a function of the PDCCH that scheduled the transmission. Similarly, the WTRU may start the {DL, UL} drx-RetransmissionTimer after expiry of the {DL, UL} drx-HARQ-RTT-Timer, where the value of the timer is selected from between two values configured by RRC as a function of the PDCCH that scheduled the transmission. The WTRU may start the drx-InactivityTimer with a value of the timer selected from different values configured by RRC as a function of the PDCCH that scheduled the transmission. In a different example, the WTRU may be configured with different DRX configurations, whereby the WTRU selects the DRX configuration as a function of the PDCCH that scheduled the transmission.

Beam Failure Recovery

When the MAC entity is configured with beam failure detection and recovery in a multi-TRP cell, the WTRU may report a beam failure using a different TRP in the cell. In one embodiment, a certain cell may have a primary TRP on which SSBs are configured and secondary TRP. The WTRU may monitor channel quality on the secondary TRP using configured CSI-RS or other RS. The MAC entity may be configured by higher layers with BFD parameters for more than one TRP. Upon detection of a beam failure on a given TRP, the WTRU may report the failure on the primary TRP, or more generally another TRP, including an indication of the TRP on which beam failure was detected. The WTRU may report the TRP identity explicitly or implicitly. In one embodiment, the WTRU may be configured with a secluded set of PRACH or PUCCH resources to indicate a beam failure has occurred on a certain TRP. In another example, the WTRU may report the beam failure and the TRP identity explicitly in a MAC-CE using another TRP in the cell or a different cell on the PUSCH or part of the payload part of a MsgA transmission in a 2-step RA procedure. The WTRU may further indicate a preferred beam identity for a secondary TRP part of beam failure recovery report. Upon transmitting a beam failure recovery request for a secondary TRP, the WTRU may monitor the PDCCH applicable to the TRP on which beam failure was detected. The WTRU may consider the recovery successful upon reception of the PDCCH applicable to the TRP on which BF was detected addressed to its C-RNTI, possibly on a specific search space or beam(s) that have been indicated to the gNB.

HARQ

The MAC entity may be configured with more than one HARQ entity, where the WTRU considers a HARQ entity applicable per TRP, TRP group, or group of TRPs transmitting the same PDCCH. Alternatively, the MAC entity may be configured with different HARQ Process ID (PID) spaces, where each PID space may be applicable to a specific TRP, TRP group, or group of TRPs transmitting the same PDCCH. The WTRU may determine which TRP is applicable for transmission/reception from the HARQ process ID indicated in the PDCCH.

From a logical point of view, the WTRU may maintain separate HARQ entities for the same physical carrier (which may logically be considered as separate carriers from a higher layer perspective). The WTRU may maintain the same physical layer characteristics of a DL carrier, though higher layers maintain separate HARQ entities. For example, the WTRU may maintain the same bandwidth part, center frequency, and related timers across the two HARQ entities. In MAC, the WTRU may simultaneously align the active bandwidth part across the configured multiple TRP and/or HARQ entities. According to an embodiment, the WTRU may ignore a scheduling DCI if it is scheduled from one TRP on a different operating bandwidth part than the active BWP. According to another embodiment, if the WTRU receives two DCIs with assignments on different bwps, the WTRU may follow the DCI in the active BWP and ignore the DCI pointing to resource allocation outside the active BWP. According to another embodiment, the WTRU may maintain a plurality of BWPs (e.g., one per HARQ entity); the WTRU may ensure that such BWPs are synchronized in terms of activity, center frequency, and other physical characteristics. The WTRU may be further configured with an association between a HARQ entity and a PCI.

According to an embodiment, the WTRU may select a PUCCH or a PUCCH resource for providing UCI as a function of the TRP or the PDCCH that pertains to the provided UCI. For example, the WTRU may be configured with more than one HARQ-ACK codebook for different schedulers/PDCCHs in the cell; the WTRU may select a codebook for feeding back HARQ Ack/Nack as a function of the PDCCH from which the DL assignment was received from.

System Access

For a cell configured with multiple TRPs and/or multiple PDCCHs, the WTRU may select a Physical Random-Access Channel (PRACH) resource and/or preamble according to the scheduling group or PCI for which access is desired. In one example, the WTRU may be configured with a partitioned preamble space or a partitioned RACH occasion space; the WTRU may select a preamble from a certain space for scheduling on a specific PDCCH, TRP, or PCI. In one example, the WTRU may measure Synchronization Signal Blocks (SSBs) on different TRPs and determine a preferred TRP (or preferred PCI) based on a received criterion (e.g. RSRP). The WTRU may select a PRACH resource associated with preferred TRP or PCI. The WTRU may monitor one PDCCH after selection of a preamble and PRACH occasion. In another example, the WTRU may monitor both PDCCHs during the Random-Access Response (RAR) window or during the contention resolution window.

The WTRU may consider an association between SSBs and PRACH resources as applicable to a subset of TRPs. The WTRU may be configured with an SSB to PRACH resource mapping that is specific to a subset of TRPs. According to another embodiment, the WTRU may be configured by RRC with more than one set of SSBs, whereby a subset of SSBs may be mapped to a subset of TRPs. The WTRU may be predefined or configured to monitor a subset of SSBs in the cell, e.g. as a function of the TRP subset on which initial access is possible or configured. In one embodiment, the WTRU may be configured with more than one uplink channel in the same cell. The WTRU may associate a certain subset of TRPs, a PCI, or a MAC entity with an uplink channel. The WTRU may select resources associated with such uplink during initial access, depending on the TRP or PCI on which the transmission is intended for. According to an embodiment, the WTRU may associate resources from certain uplink as a function of the PDCCH on which scheduling was received from. For example, RRC may configure an association between PDCCH and a {PUSCH, PUCCH} or a set of {PUSCH, PUCCH} resources. The WTRU may then determine the {PUSCH, PUCCH} or the set of {PUSCH, PUCCH} resources from the PDCCH on which the DCI was received.

According to an embodiment, a WTRU may be configured with an SR configuration applicable to a group of TRPs sharing the same PDCCH or the same PCI. The WTRU may select the SR configuration associated with the PDCCH or PCI for which the WTRU needs to be scheduled from. The WTRU may monitor one PDCCH after transmitting an SR on an SR configuration associated with the corresponding PDCCH or PCI for receiving an UL grant. In another example, the WTRU may monitor both PDCCHs during after transmitting an SR.

Measurements, Mobility, and PCI Selection

In one embodiment, the WTRU may be configured with measurement objects to measure layer 2/layer 3 measurements (e.g. RSRP, Reference Signal Received Quality (RSRQ)) and report the measurements per TRP or per PCI. The WTRU may perform intra-cell mobility, e.g. when TRPs in the cell are configured with different PCIs. The WTRU may consider the second-best beam in the source TRP and a potential target TRP prior to handing over. For example, the WTRU may average signal quality metrics over the two best beams in the source and target TRPs upon evaluating handover decisions.

Figure 3:
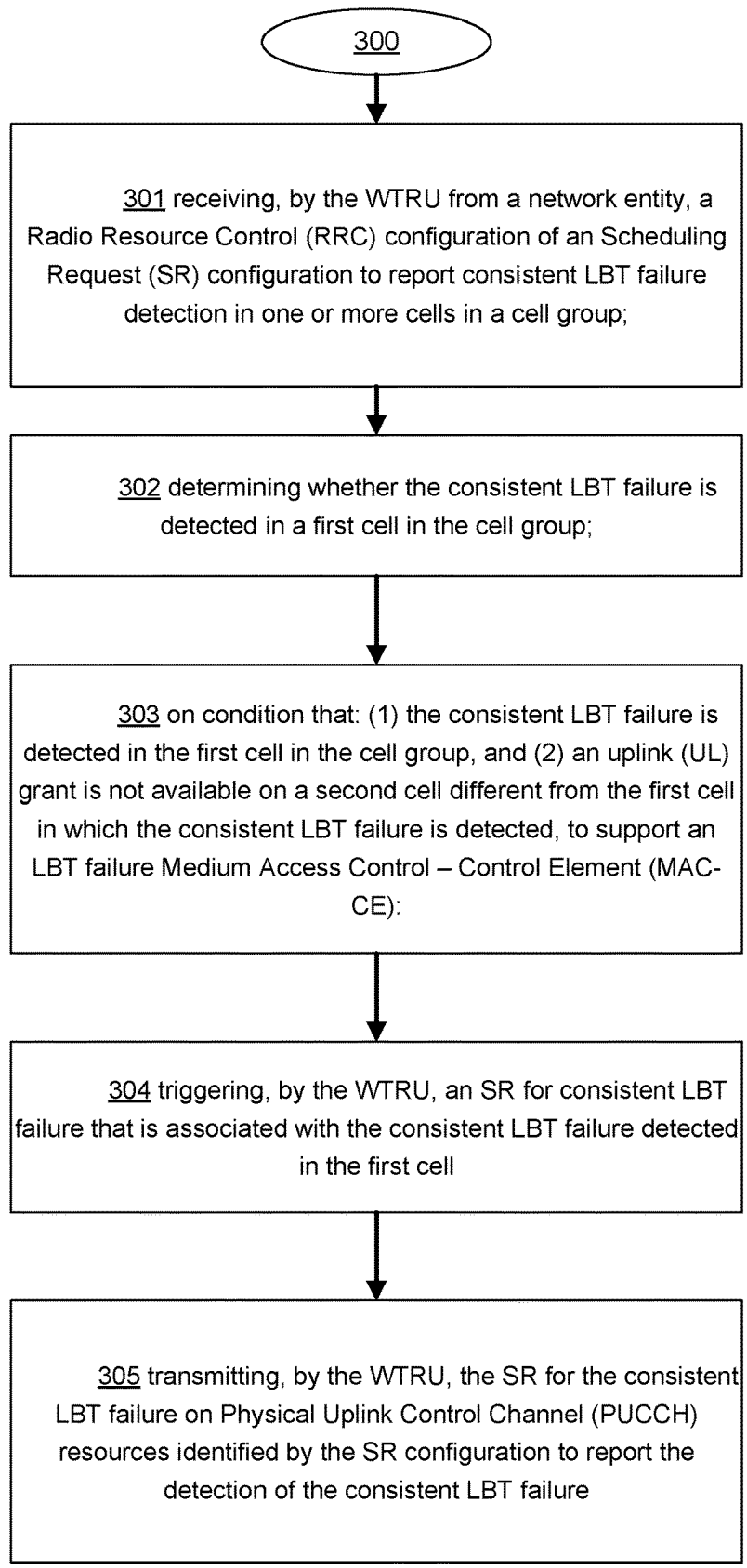
FIG. 3 is a flow chart illustrating a representative method of reporting a consistent Listen Before Talk (LBT) failure.

FIG. 3 is a flow chart illustrating a representative method of reporting a consistent Listen Before Talk (LBT) failure.

Referring to FIG. 3, the representative method 300 may include, in 301, receiving, by a WTRU from a network entity, a Radio Resource Control (RRC) configuration of a Scheduling Request (SR) configuration to report consistent LBT failure detection in one or more cells in a cell group; in 302, determining whether the consistent LBT failure is detected in a first cell in the cell group; in 303, on condition that: (1) the consistent LBT failure is detected in the first cell in the cell group, and (2) an uplink (UL) grant is not available on a second cell different from the first cell in which the consistent LBT failure is detected, to support an LBT failure Medium Access Control—Control Element (MAC-CE): triggering, 304, by the WTRU, an SR for consistent LBT failure that is associated with the consistent LBT failure detected in the first cell; and transmitting, 305, by the WTRU, the SR for the consistent LBT failure on Physical Uplink Control Channel (PUCCH) resources identified by the SR configuration to report the detection of the consistent LBT failure.

In certain representative embodiments, the method may include, on condition that: (1) the consistent LBT failure is detected in the first cell in the cell group, and (2) an uplink (UL) grant is available on the second cell different from the first cell in which the consistent LBT failure is detected: generating, by the WTRU, the LBT failure MAC-CE; and transmitting, by the WTRU, the generated LBT failure MAC-CE, wherein the LBT failure MAC-CE includes one or more indexes including at least an index of the first cell associated with the detected consistent LBT failure.

For example, the one or more indexes is a plurality of indexes associated with consistent LBT failure detected in multiple cells.

For example, the SR configuration includes information identifying the Physical Uplink Control Channel (PUCCH) resources on one or a plurality of bandwidth parts (BWPs) used to report the detected consistent LBT failures in multiple cells.

Figure 4:
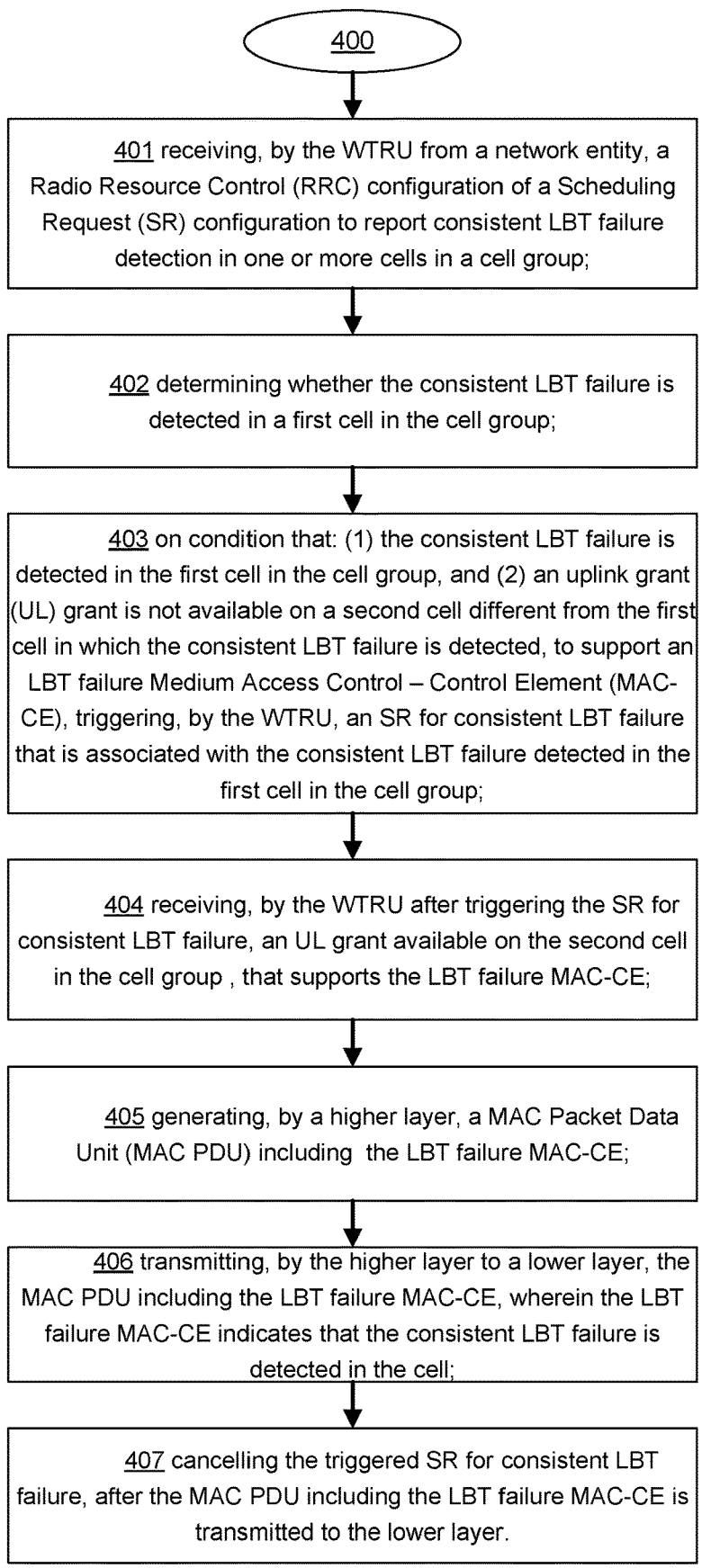
FIG. 4 is a flow chart illustrating another representative method of reporting a consistent LBT failure.

FIG. 4 is a flow chart illustrating another representative method of reporting a consistent LBT failure.

Referring to FIG. 4, the representative method 400 may include, at block 401, receiving, by the WTRU from a network entity, a Radio Resource Control (RRC) configuration of a Scheduling Request (SR) configuration to report consistent LBT failure detection in one or more cells in a cell group; determining, 402, whether the consistent LBT failure is detected in a first cell in the cell group; on condition that, 403: (1) the consistent LBT failure is detected in the first cell in the cell group, and (2) an uplink grant (UL) grant is not available on a second cell different from the first cell in which the consistent LBT failure is detected, to support an LBT failure Medium Access Control—Control Element (MAC-CE), triggering, by the WTRU, an SR for consistent LBT failure that is associated with the consistent LBT failure detected in the first cell in the cell group; receiving, 404, by the WTRU after triggering the SR for consistent LBT failure, an UL grant available on the second cell in the cell group, that supports the LBT failure MAC-CE; generating, 405, by a higher layer, a MAC Packet Data Unit (MAC PDU) including the LBT failure MAC-CE; and transmitting, 406, by the higher layer to a lower layer, the MAC PDU including the LBT failure MAC-CE, wherein the LBT failure MAC-CE indicates that the consistent LBT failure is detected in the cell; and cancelling, 407, the triggered SR for consistent LBT failure, after the MAC PDU including the LBT failure MAC-CE is transmitted to the lower layer.

For example, the triggered SR is canceled after the MAC PDU is transmitted to a network entity. For example, the triggered SR for consistent LBT failure is cancelled on condition that the WTRU receives a re-configuration related LBT failure. For example, the triggered SR for consistent LBT failure is cancelled on condition that the MAC PDU including the LBT failure MAC-CE is provided to a physical layer (PHY), as the lower layer, for transmission.

For example, the LBT failure MAC-CE includes a cell index of the first cell associated with the detected consistent LBT failure. For example, the LBT failure MAC-CE includes a plurality of cell indexes associated with consistent LBT failure detected in multiple cells.

For example, the generated MAC PDU includes a Logical channel Identifier (LC ID) value associated with the LBT failure MAC-CE.

Figure 5:
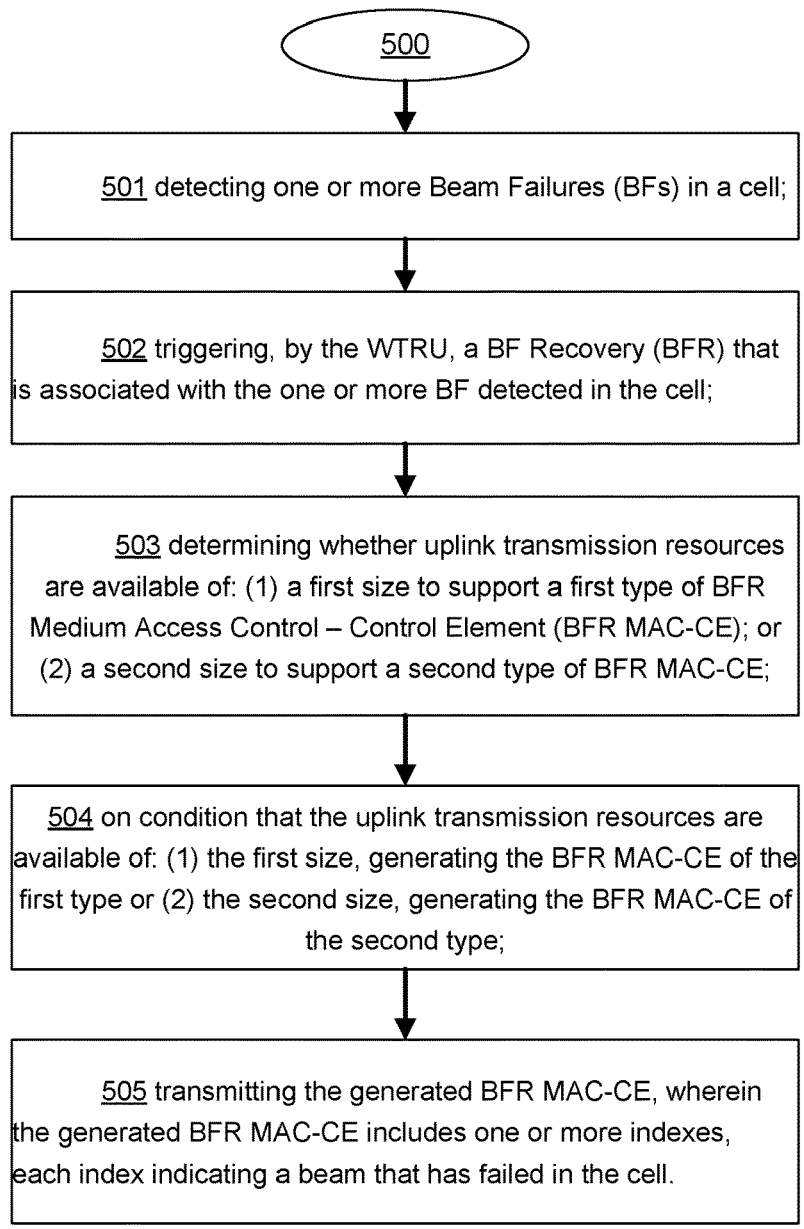
FIG. 5 is a flow chart illustrating a representative method of transmitting a Beam Failure Recovery (BFR) Medium Access Control—Control Element (MAC-CE).

FIG. 5 is a flow chart illustrating a representative method of transmitting a Beam Failure Recovery (BFR) Medium Access Control—Control Element (MAC-CE).

Referring to FIG. 5, the representative method 500 may include, at block 501, detecting one or more Beam Failures (BFs) in a cell; triggering, 502, by the WTRU, a BF Recovery (BFR) that is associated with the one or more BF detected in the cell; determining, 503, whether uplink transmission resources are available of: (1) a first size to support a first type of BFR Medium Access Control-Control Element (BFR MAC-CE); or (2) a second size to support a second type of BFR MAC-CE; 504, on condition that the uplink transmission resources are available of: (1) the first size, generating the BFR MAC-CE of the first type or (2) the second size, generating the BFR MAC-CE of the second type; and, 505, transmitting the generated BFR MAC-CE, wherein the generated BFR MAC-CE includes one or more indexes, each index indicating a beam that has failed in the cell.

For example, the first type of BFR MAC-CE is a full BFR MAC-CE, and the second type of BFR MAC-CE is a truncated BFR MAC-CE.

For example, a MAC Packet Data Unit (MAC-PDU) includes the generated BFR MAC-CE and a Logical Channel Identifier (LC ID) value associated with the BFR MAC-CE.

For example, the BFR MAC-CE comprises at least one index of a preferred beam.

For example, it is determined that the beam failure is recovered from on condition that the WTRU receives a Physical Downlink Control Channel (PDCCH) scheduling an uplink grant for a same Hybrid/Automatic Repeat Request (HARQ) process ID used to transmit the BFR MAC-CE.

Figure 6:
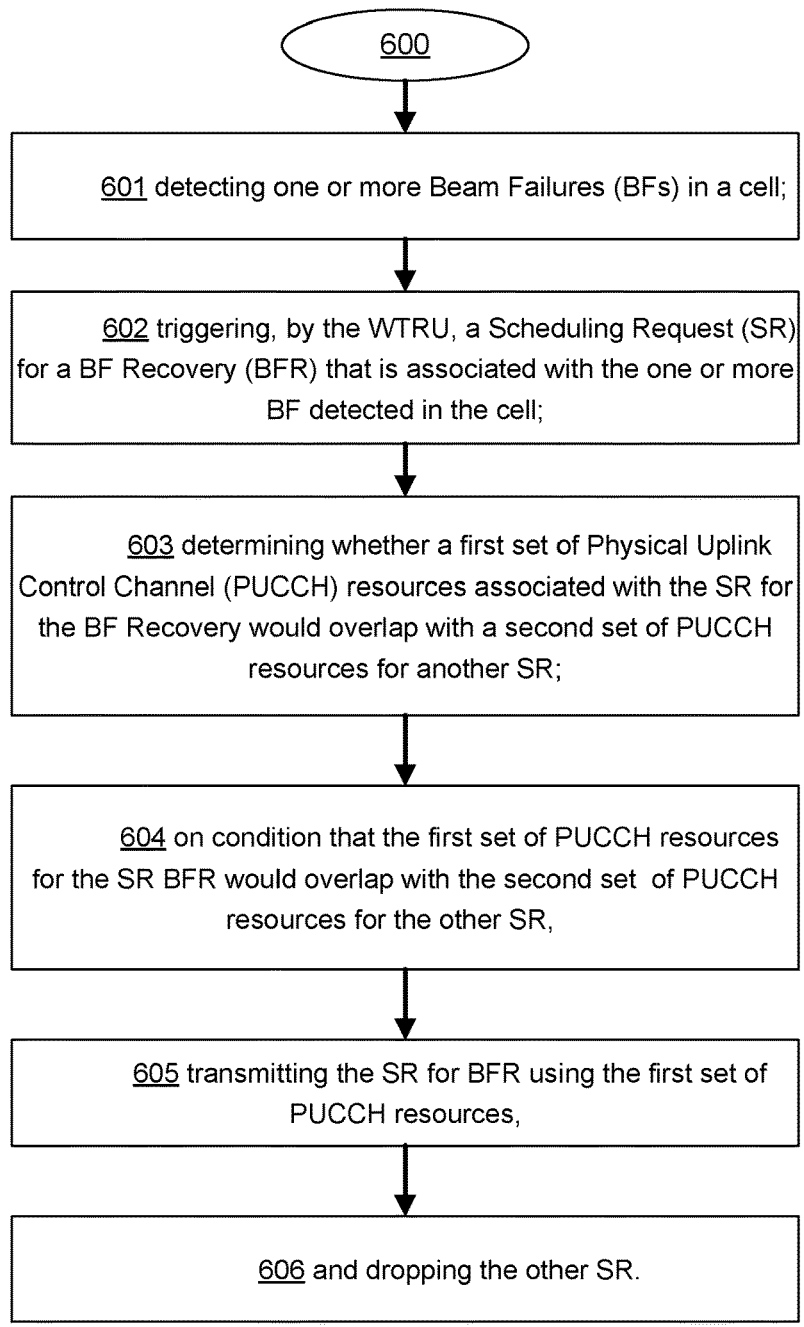
FIG. 6 is a flow chart illustrating a representative method of transmitting a Scheduling Request (SR) for BFR.

FIG. 6 is a flow chart illustrating a representative method of transmitting a Scheduling Request (SR) for BFR.

Referring to FIG. 6, the representative method 600 may include, at block 601, detecting one or more Beam Failures (BFs) in a cell; triggering, 602, by the WTRU, a Scheduling Request (SR) for a BF Recovery (BFR) that is associated with the one or more BF detected in the cell; determining, 603, whether a first set of Physical Uplink Control Channel (PUCCH) resources associated with the SR for the BF Recovery would overlap with a second set of PUCCH resources for another SR; 604, on condition that the first set of PUCCH resources for the SR BFR would overlap with the second set of PUCCH resources for the other SR: transmitting, 605, the SR for BFR using the first set of PUCCH resources, and dropping, 606, the other SR.

In certain representative embodiments, the method may include cancelling the triggered SR for BFR on condition that a Medium Access Control Protocol Data Unit (MAC-PDU) including a BFR MAC-Control Element (BFR MAC-CE) indicating the one or more BFs detected in the cell, is transmitted.

For example, the triggering of the SR for the BFR associated with the one or more BF detected in the cell is conditioned on the WTRU not obtaining an Uplink (UL) grant for transmitting a BFR MAC-Control Element (MAC-CE).

For example, it is determined that the beam failure is recovered on condition that the WTRU receives a Physical Downlink Control Channel (PDCCH) scheduling an uplink grant for a same Hybrid/Automatic Repeat Request (HARQ) process ID used to transmit the BFR MAC-CE.

CONCLUSION

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit, such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer. In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) comprising a processor, the processor configured to:
   detect consistent listen before talk (LBT) failure for a first cell;
   determine that uplink (UL) resources that can be used for transmitting an indication of the consistent LBT failure are available in a second cell; and
   transmit a medium access control element (MAC-CE) that indicates that consistent LBT failure has occurred for the first cell, wherein the MAC-CE is transmitted using the UL resources in the second cell, and wherein the MAC-CE comprises a bitmap, the bitmap comprising a plurality of bits, wherein each bit of the plurality bits corresponds to a cell index of a respective cell, wherein a bit of the bitmap corresponding to the cell index of the first cell indicates the consistent LBT failure associated with the first cell.

2. The WTRU of claim 1, wherein the processor is further configured to:
   receive a radio resource control (RRC) message, wherein the RRC message comprises scheduling request (SR) configuration information associated with consistent LBT failure reporting, and wherein the SR configuration information indicates resources to be used by the WTRU for sending an SR associated with consistent LBT failure reporting.

3. The WTRU of claim 2, wherein the processor being configured to determine the UL resources that can be used for transmitting the indication of the consistent LBT failure are available in the second cell comprises the processor being configured to:
   transmit an SR using the resources indicated by the SR configuration information associated with consistent LBT failure reporting; and
   receive an UL grant after transmitting the SR on the resources indicated by the SR configuration information associated with consistent LBT failure reporting, the UL grant indicating the UL resources in the second cell.

4. The WTRU of claim 3, wherein the processor is further configured to:
   cancel further SR transmissions using the resources indicated by the SR configuration information associated with consistent LBT failure reporting based on transmitting MAC-CE that indicates that consistent LBT failure has occurred for the first cell.

5. The WTRU of claim 3, wherein the processor is further configured to:
   cancel further SR transmissions using the resources indicated by the SR configuration information associated with consistent LBT failure reporting based on receiving reconfiguration information associated with consistent LBT failure recovery for the first cell.

6. The WTRU of claim 1, wherein the processor being configured to detect consistent LBT failure comprises the processor being configured to: determine that a number of LBT attempts failures for the first cell during a period of time is greater than a threshold.

7. The WTRU of claim 1, wherein the bitmap comprised in the MAC-CE is used to indicate cell indices of a plurality of cells for which the WTRU has detected consistent LBT failure.

8. The WTRU of claim 1, wherein the MAC-CE comprises an indication of a logical channel index, the indication of the logical channel index being an indication that the MAC-CE is for reporting consistent LBT failure.

9. A method implemented by a wireless transmit/receive unit (WTRU) comprising, the method comprising:
   detecting consistent listen before talk (LBT) failure for a first cell;
   determining that uplink (UL) resources that can be used for transmitting an indication of the consistent LBT failure are available in a second cell; and transmitting a medium access control element (MAC-CE) that indicates that consistent LBT failure has occurred for the first cell, wherein the MAC-CE is transmitted using the UL resources associated with the second cell, and wherein the MAC-CE comprises a bitmap, the bitmap comprising a plurality of bits, wherein each bit of the plurality bits corresponds to a cell index of a respective cell, wherein a bit of the bitmap corresponding to the cell index of the first cell indicates the consistent LBT failure associated with the first cell.

10. The method of claim 9, further comprising:
receiving a radio resource control (RRC) message, the RRC message comprising scheduling request (SR) configuration information associated with consistent LBT failure reporting, the SR configuration information indicating resources to be used by the WTRU for sending an SR associated with consistent LBT failure reporting, wherein the WTRU determining the UL resources that can be used for transmitting an indication of the consistent LBT failure are available in the second cell comprises:
transmitting an SR using the resources indicated by the SR configuration information associated with consistent LBT failure reporting; and
receiving an UL grant after transmitting the SR on the resources indicated by the SR configuration information associated with consistent LBT failure reporting, the UL grant indicating the UL resources that can be used for transmitting an indication of the consistent LBT failure are available in the second cell.

11. The method of claim 10, further comprising cancelling further SR transmissions using the resources indicated by the SR configuration information associated with consistent LBT failure reporting based on:
transmitting MAC-CE that indicates that consistent LBT failure has occurred for the first cell; or
receiving reconfiguration information associated with consistent LBT failure recovery for the first cell.

12. The method of claim 9, wherein the bitmap comprised in the MAC-CE is used to indicate cell indices of a plurality of cells for which the WTRU has detected consistent LBT failure.

13. The method of claim 9, wherein the MAC-CE comprises an indication of a logical channel index, the indication of the logical channel index being an indication that the MAC-CE is for reporting consistent LBT failure.

14. A wireless transmit/receive unit (WTRU) comprising a processor, the processor configured to:
receive a radio resource control (RRC) message, wherein the RRC message comprises scheduling request (SR) configuration information associated with consistent listen before talk (LBT) failure reporting, and wherein the SR configuration information indicates resources to be used by the WTRU for sending an SR associated with consistent LBT failure reporting;
detect consistent LBT failure for a first cell, wherein consistent LBT failure is detected based on a number of LBT attempts failures for the first cell during a period of time being greater than a threshold;
transmit an SR using the resources indicated by the SR configuration information associated with consistent LBT failure reporting; and
receive an UL grant after transmitting the SR on the resources indicated by the SR configuration information associated with consistent LBT failure reporting, the UL grant indicating the UL resources in a second cell; and
transmit a medium access control element (MAC-CE) that indicates that consistent LBT failure has occurred for the first cell, wherein the MAC-CE is transmitted using the UL resources in the second cell, and wherein the MAC-CE comprises a bitmap, the bitmap comprising a plurality of bits, wherein each bit of the plurality of bits corresponds to a cell index of a respective cell, wherein a bit of the bitmap corresponding to the cell index of the first cell indicates the consistent LBT failure associated with the first cell.

\* \* \* \* \*